Figure 1:
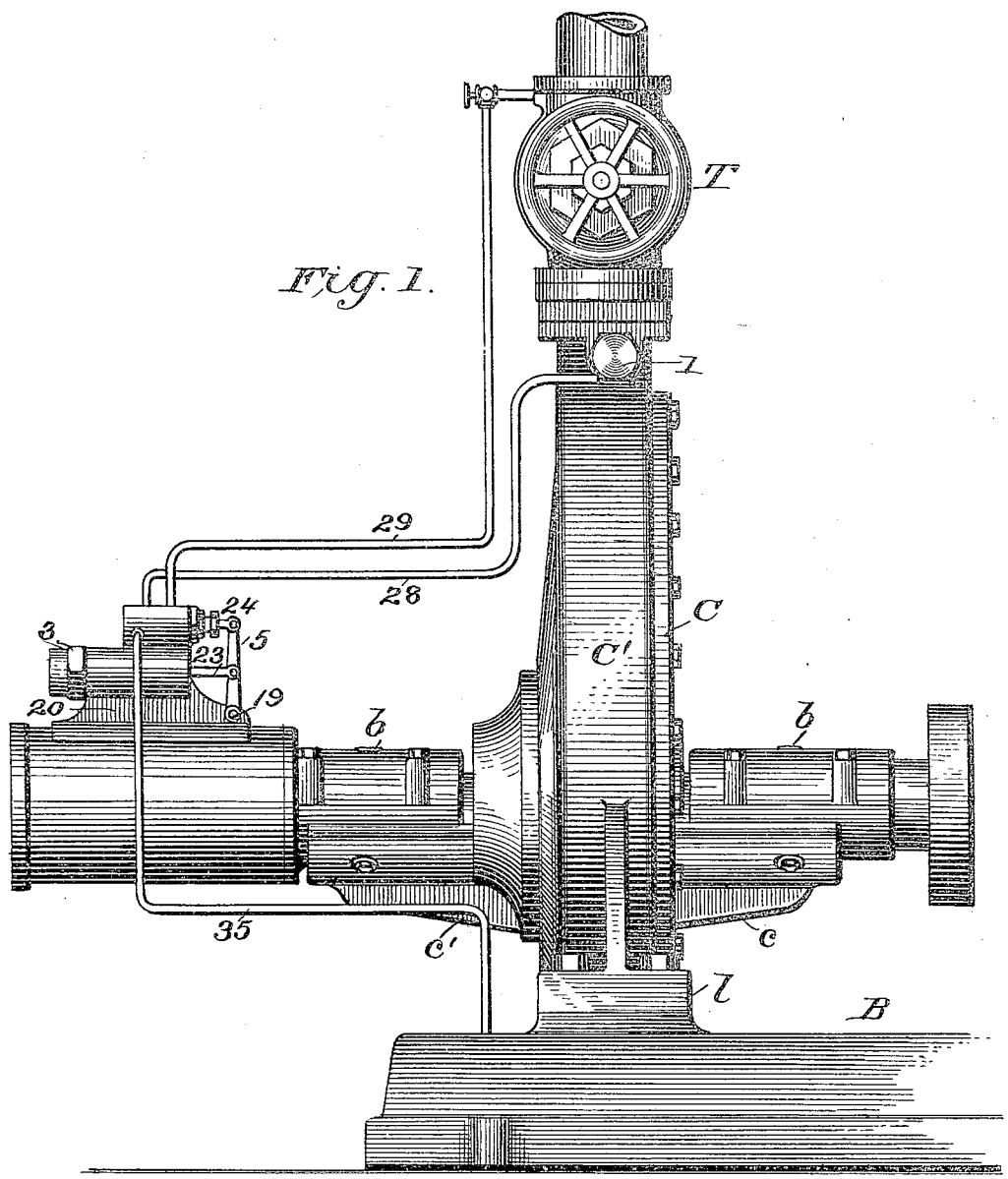

No. 808,152. PATENTED DEC. 26, 1905.
M. A. GREEN.
ELASTIC FLUID TURBINE.
APPLICATION FILED DEC. 14, 1904. RENEWED NOV. 23, 1905.

10 SHEETS—SHEET 1.

WITNESSES:
Jos. A. Ryan.
Edw. W. Byrn.

INVENTOR
Martin A. Green
BY Munn & Co.
ATTORNEYS

No. 808,152. PATENTED DEC. 26, 1905.
M. A. GREEN.
ELASTIC FLUID TURBINE.
APPLICATION FILED DEC. 14, 1904. RENEWED NOV. 23, 1905.
10 SHEETS—SHEET 2.
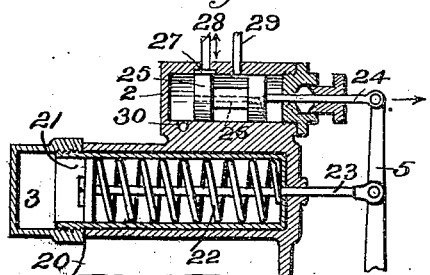
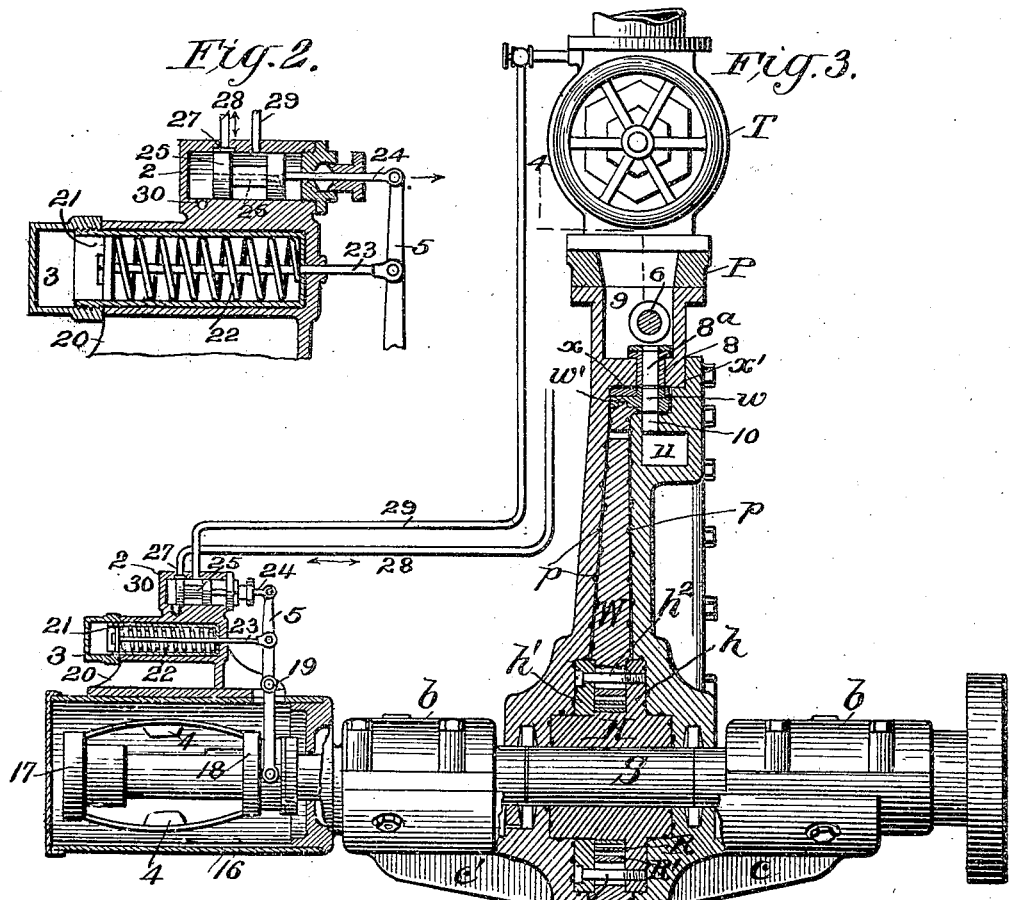
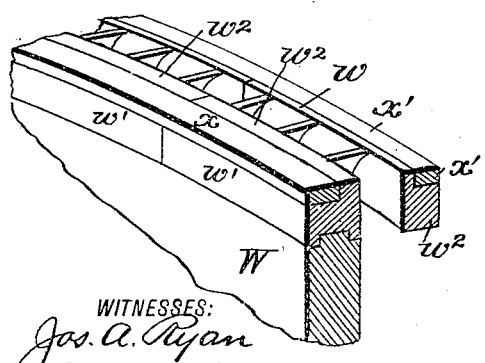
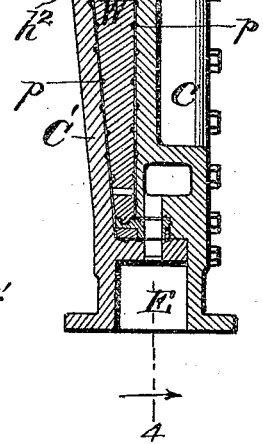
WITNESSES:
Jos. A. Ryan
Edw. W. Byrn
INVENTOR
Martin A. Green
BY Munn & Co.
ATTORNEYS

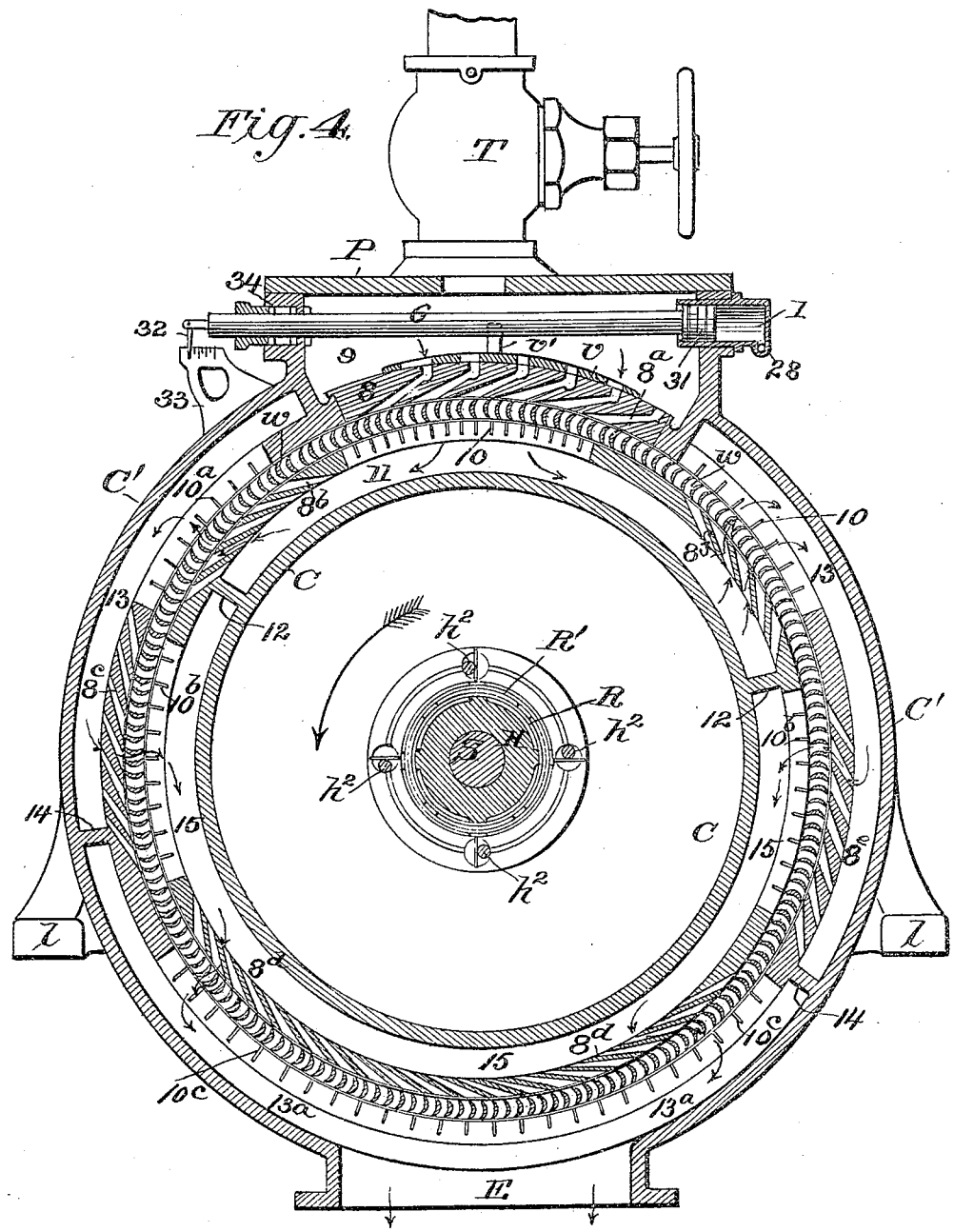

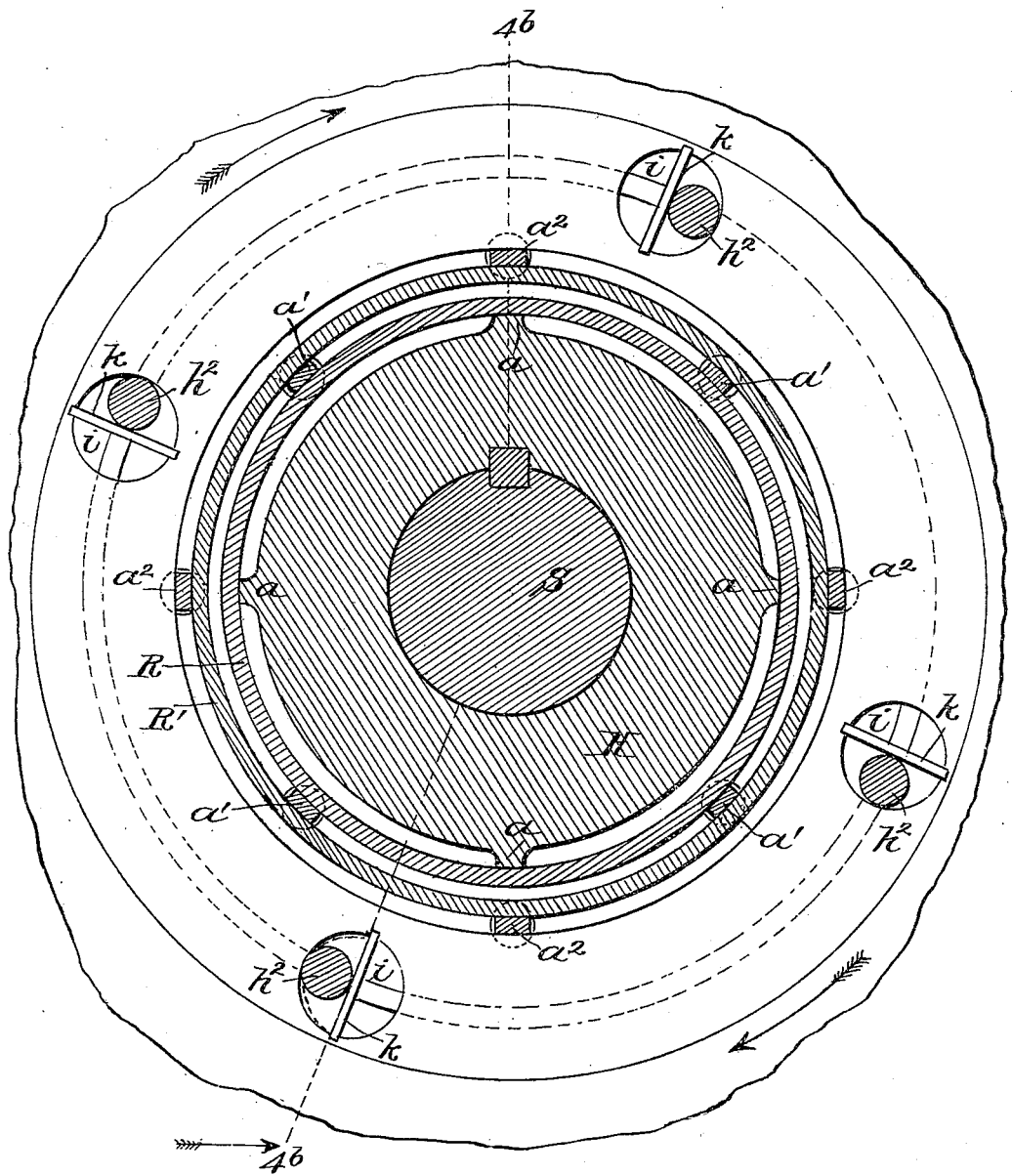

No. 808,152. PATENTED DEC. 26, 1905.
M. A. GREEN.
ELASTIC FLUID TURBINE.
APPLICATION FILED DEC. 14, 1904. RENEWED NOV. 23, 1905.
10 SHEETS—SHEET 5.
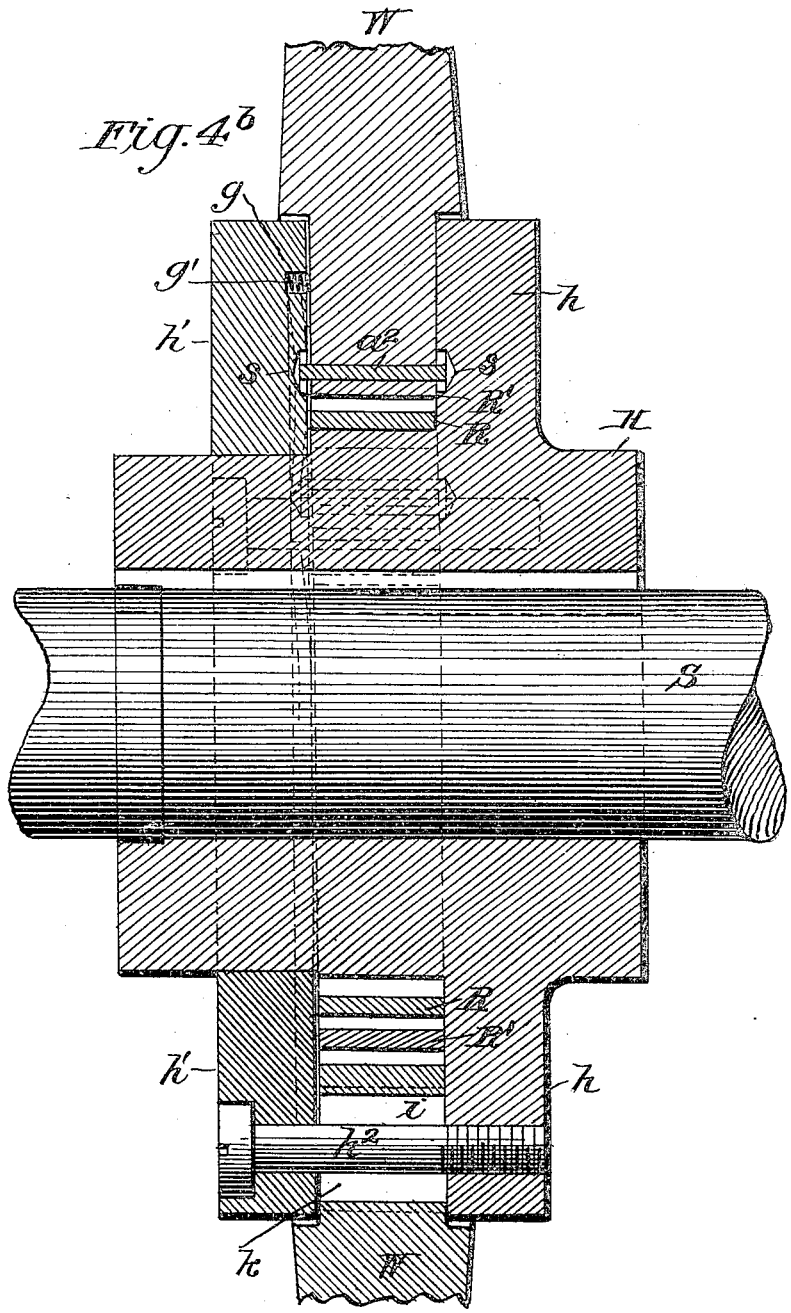

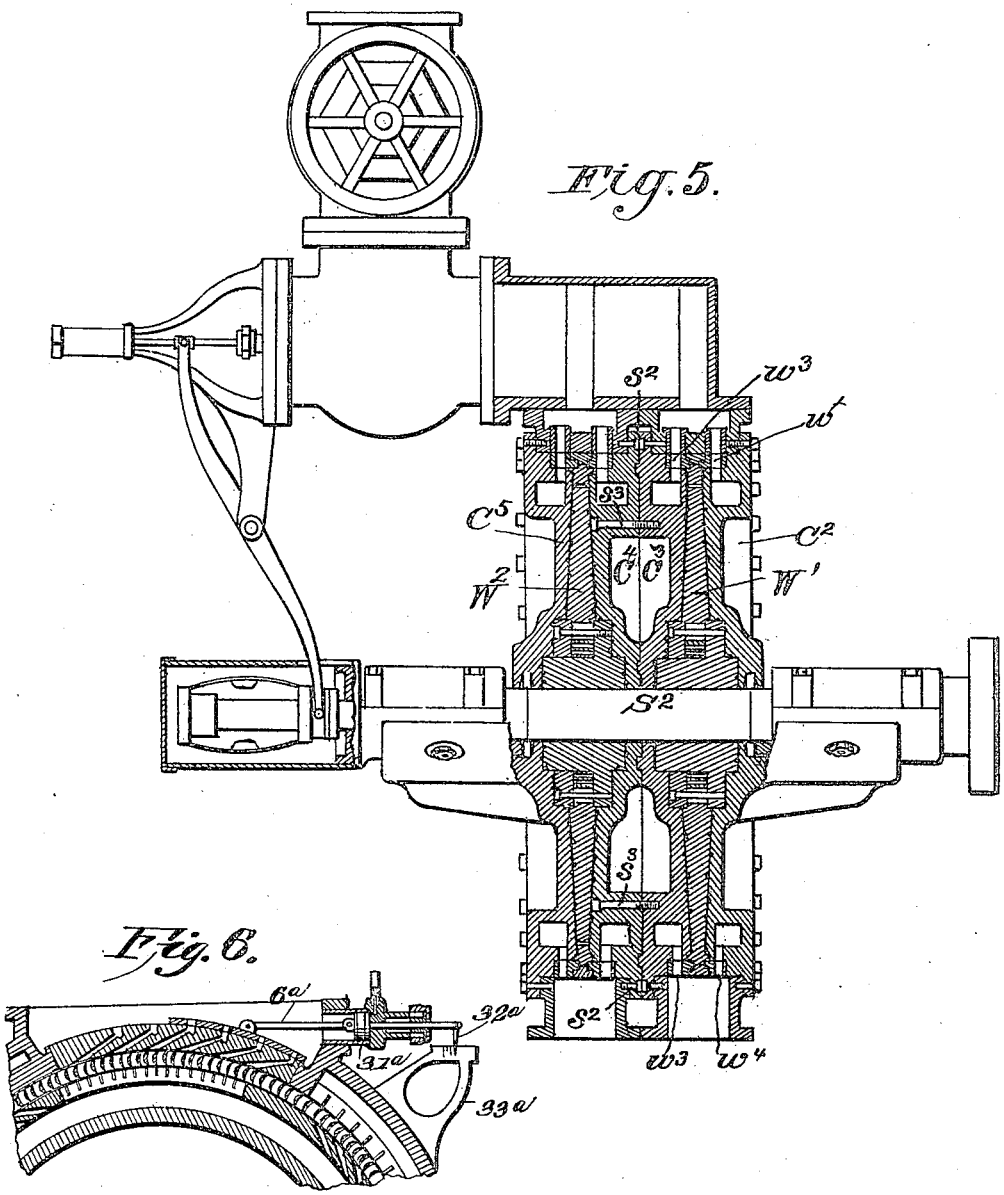

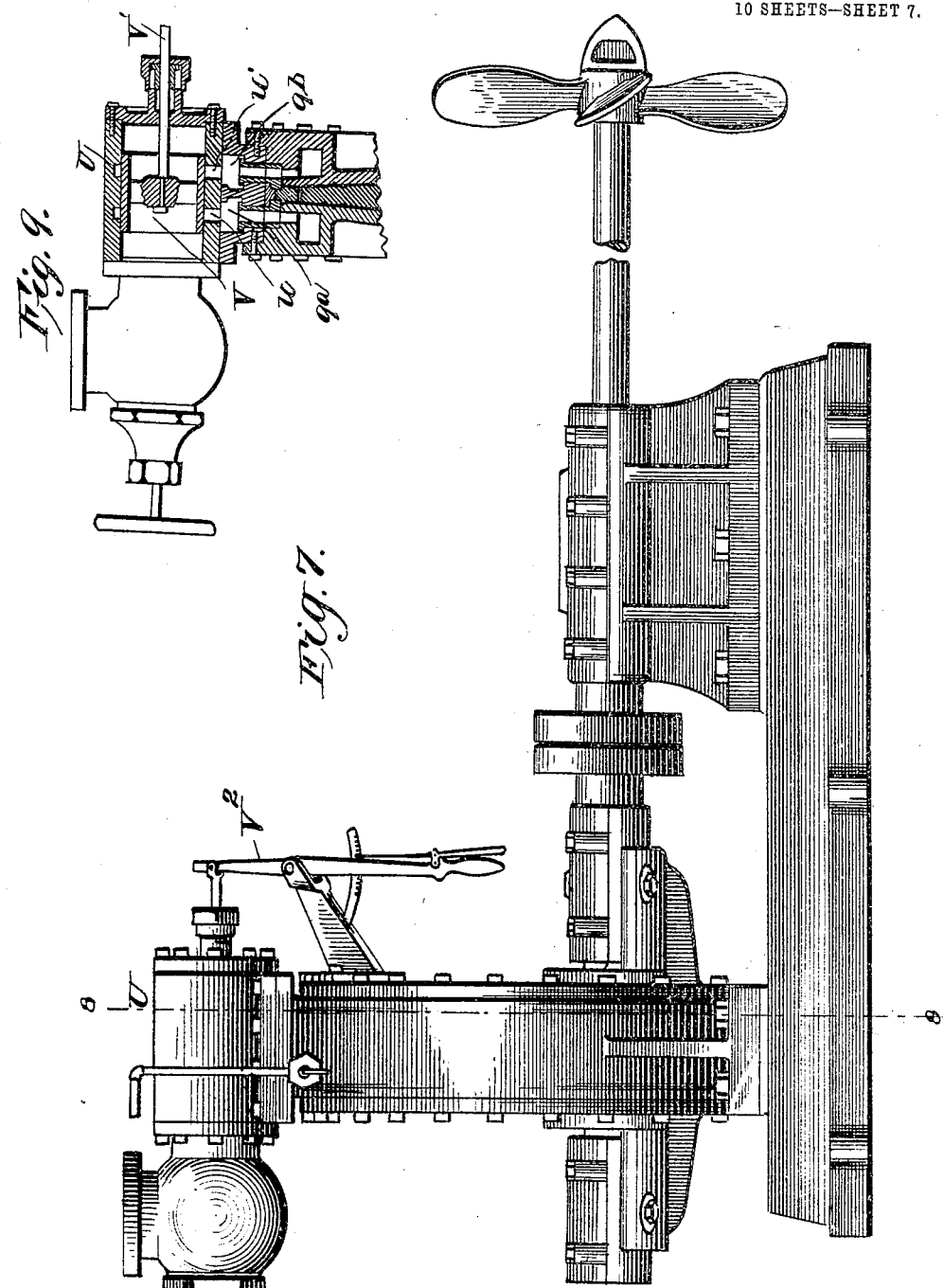

No. 808,152. PATENTED DEC. 26, 1905.
M. A. GREEN.
ELASTIC FLUID TURBINE.
APPLICATION FILED DEC. 14, 1904. RENEWED NOV. 23, 1905.

10 SHEETS—SHEET 8.

WITNESSES
Jos. A. Ryan
Edw. W. Byrn

INVENTOR
Martin A. Green
BY Munn & Co.
ATTORNEYS

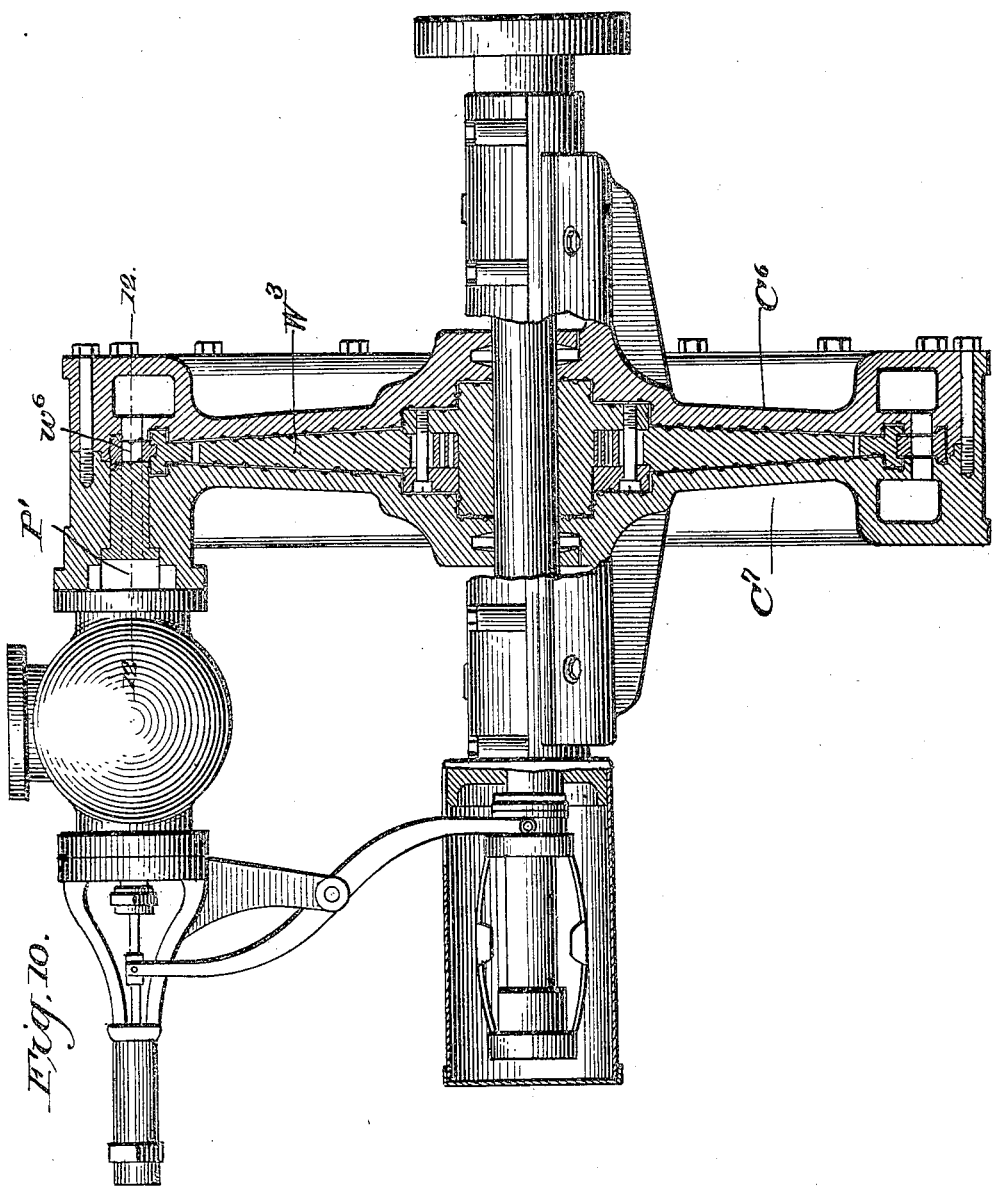

No. 808,152. PATENTED DEC. 26, 1905.
M. A. GREEN.
ELASTIC FLUID TURBINE.
APPLICATION FILED DEC. 14, 1904. RENEWED NOV. 23, 1905.
10 SHEETS—SHEET 10.
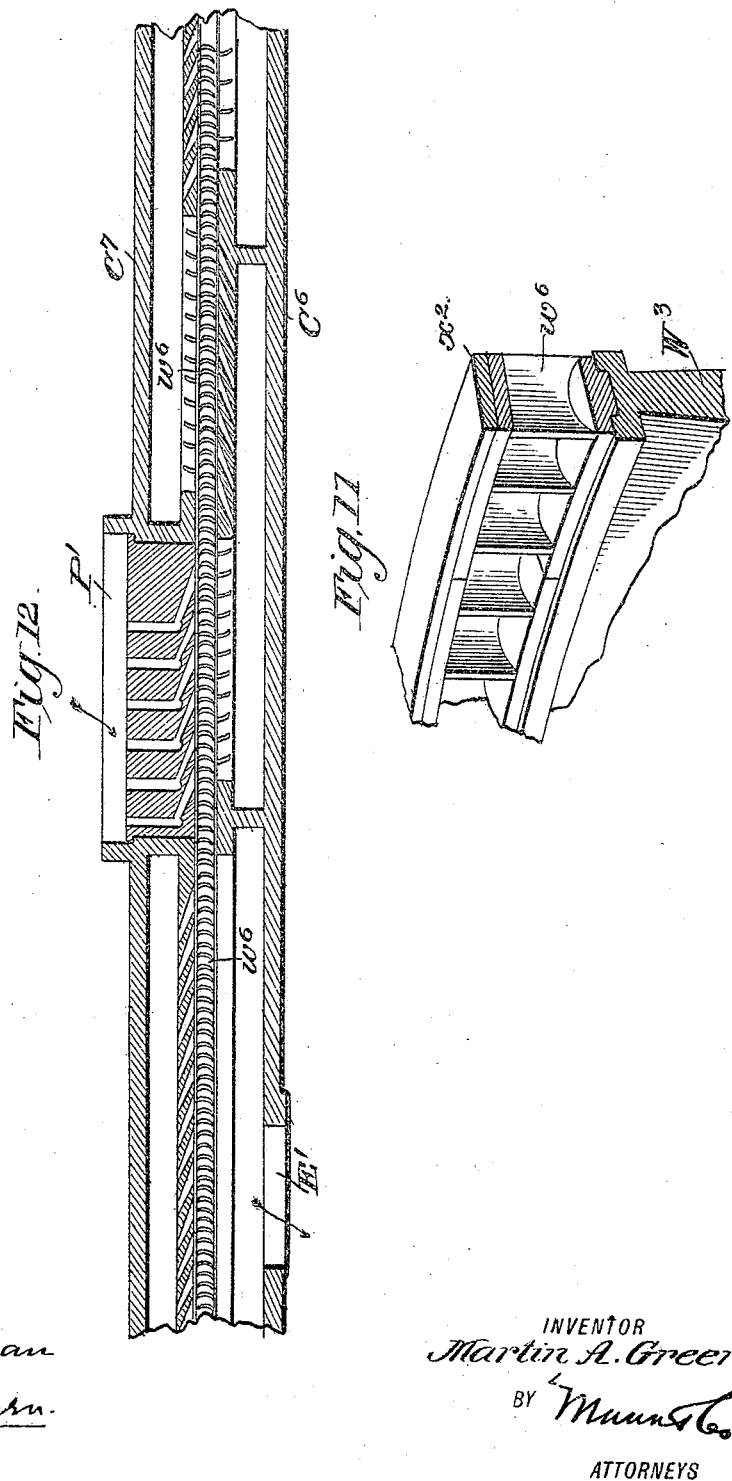
WITNESSES:
Jos. A. Ryan
Edw. W. Byrn
INVENTOR
Martin A. Green.
BY Munn & Co.
ATTORNEYS

UNITED STATES PATENT OFFICE.

MARTIN A. GREEN, OF PHILADELPHIA, PENNSYLVANIA.

ELASTIC-FLUID TURBINE.

No. 808,152. Specification of Letters Patent. Patented Dec. 26, 1905.

Application filed December 14, 1904. Renewed November 23, 1905. Serial No. 288,728.

*To all whom it may concern:*

Be it known that I, MARTIN A. GREEN, a citizen of the United States, residing in the city of Philadelphia, county of Philadelphia, and State of Pennsylvania, have invented certain new and useful Improvements in Elastic-Fluid Turbine-Engines, of which the following is a specification.

It has for its object to provide an economic slow-speed engine of such character that will utilize the power of steam admitted to it to a very high degree, which is especially adapted to avoid loss of power through leakage, and in which provision is made for so distributing the impulses which actuate the turbine as to balance the wheel in all directions.

The principal feature of my invention is to construct a turbine with one wheel only and produce the same or better results than other types of turbines using from six to eight wheels. Most all types of turbine-engines use many wheels, so as to expand the steam, and they are compelled to use many wheels in getting the required efficiency, for the reason that they only use a small portion of each wheel.

In my invention I use steam around a full periphery of the wheel passing through the same buckets of the wheel several times—that is to say, the steam strikes the wheel at the top through the main external admission-ports, then expanding to a certain degree passes through the buckets of the wheel into an inner receiving-chamber. In that receiving-chamber and close to the buckets in the wheel are what I would term "baffle-blades"— that is to say, as the steam exhausts through the wheel at the angle of the buckets in the wheel as it enters the interior receiving-chamber the steam strikes against the baffle-blades and reacting transmits its backlash-power to the wheel without any sacrifice to the steam. The steam then passes from one portion of this interior chamber to another, and there being additional nozzles at each end of this chamber the steam passes through at certain expansions and, striking the inner portion of the buckets of the wheel, goes outwardly through the same and strikes other sets of baffle-blades placed exterior to the buckets and, passing into an exterior receiving-chamber and back through additional exterior nozzles on to the buckets of the wheel again, it again passes through the same into another interior receiving-chamber. There it comes in contact with another set of interior baffle-blades and into a large receiving-chamber. Again, the steam is passed outwardly through nozzles or ports, expanding the steam, and, going through the buckets of the wheel and striking another set of exterior baffling-blades, exhausts into an exterior exhaust-chamber, whence it is either sent to the atmosphere or into a condenser. As the steam passes alternately inward and outward through the buckets of the wheel its general path is in the plane of the wheel and its traverse is around the periphery of the wheel to the point of exhaust with gradual expansions, which utilizes the kinetic energy of the steam, with repeated effect on the same series of buckets of the wheel, so as to reach a high efficiency. It will also be noticed that the steam starts on the extreme periphery of the wheel at the longest leverage from the axis and dividing moves in two directions around the wheel to the exhaust, but always with the same working thrust on the wheel, and produces the greatest power.

My invention comprises certain novel constructions and arrangements of parts operating upon the above-described principle; also, in the novel combination therewith of an automatic cut-off; also, in the novel construction and arrangement of parts for enabling the wheel when in high speed of rotation to adjust itself to its own running center of gravity and plane of rotation; also, in the novel combination therewith of an automatic governor; also, in provision for reversing the engine; also, further, in provision for multiplying the units of the engine to bring its efficiency up to any horse-power desired, and also, further, in various minor features of construction and arrangement in detail, all directed to increasing the efficiency, facilitating the building of the wheel, and contributing to its simplicity, cheapness, and practical value, as will be hereinafter more fully described with reference to the drawings, in which—

Figure 8:
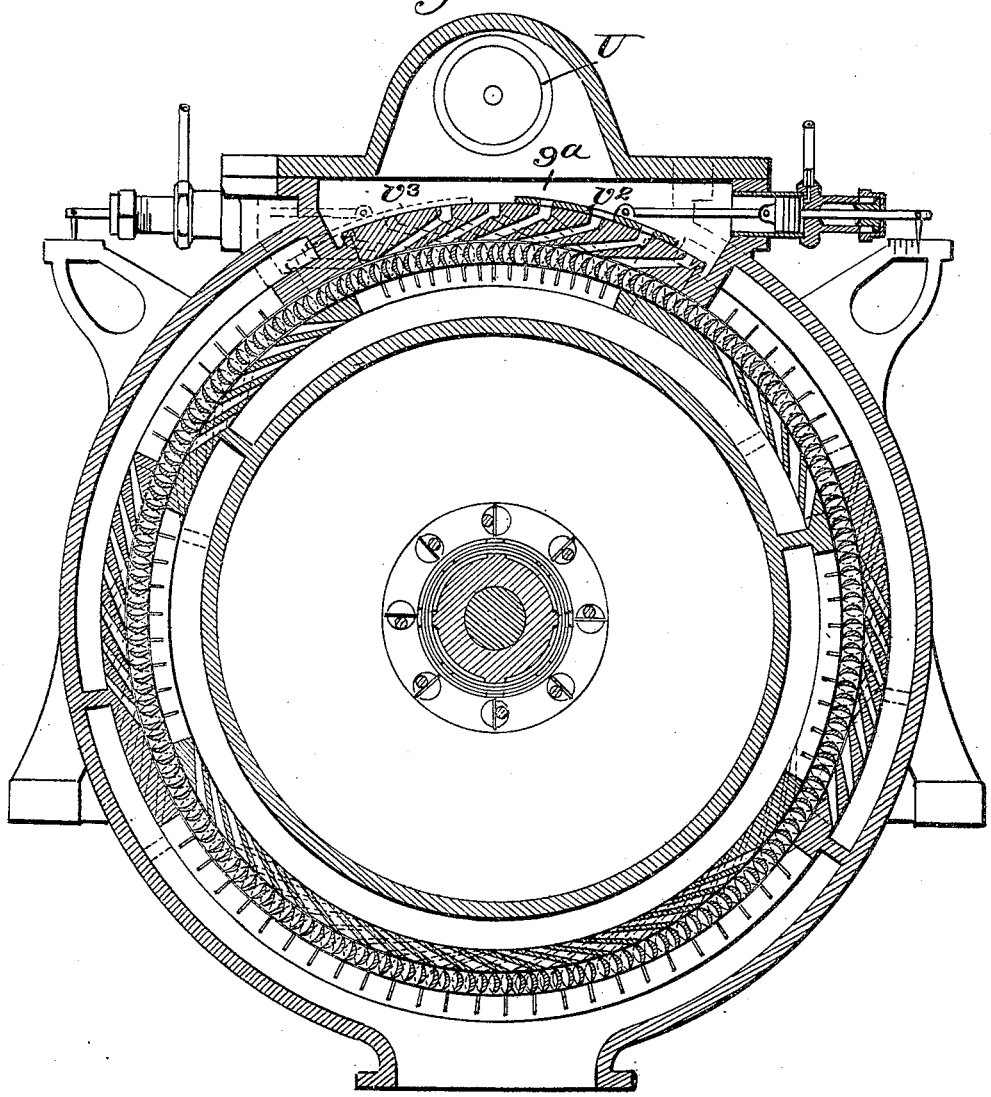

Figure 1 is a side elevation of the engine alone with the right-hand portion of the base broken away, the latter being in practice extended to receive the driven machinery, whether this be an electric generator, a propeller-shaft, or other part which for simplicity and compactness may be mounted on the same base with the turbine proper. Fig. 2 is a vertical longitudinal section through the valve mechanism at the left-hand side of Fig. 1. Fig. 3 is a vertical central section taken through the turbine-wheel, its casing, and some of its governor mechanism, the plane of the section being longitudinal to the axis of the wheel. Fig. 4 is a vertical section taken on about line 4 4 of Fig. 3 looking in the direction of the arrow, the section being transverse to the axis of rotation and passing through the buckets, nozzles, receiving-chambers, and baffle-plates at the outer periphery of the wheel. Fig. 4ª is an enlarged sectional side view of the central hub portion of the wheel; and Fig. 4ᵇ, an enlarged sectional view on line 4ᵇ 4ᵇ of Fig. 4ª, showing the mounting of the wheel, so as to adjust itself to its own center and plane of rotation, and showing also how the torque or rotary strain is rendered elastic and distributed around the wheel. Fig. 4ᶜ is a detail in perspective of a part of the periphery of the wheel. Figs. 5 and 6 are sections in planes at right angles to each other, showing the wheel constructed with a double row of buckets, one row on each side of the web of the wheel, and also showing how the units of the wheel may be assembled for indefinite multiplication on the same shaft. Figs. 7, 8, and 9 show a further extension of my invention for a reversing-engine as is required when applied to a ship's propeller, Fig. 7 being a side elevation and Figs. 8 and 9 being sections at right angles to each other and embodying the same general principles of construction and operation, Fig. 8 being taken on line 8 8 of Fig. 7. Figs. 10, 11, and 12 are views showing a further modification of my invention, in which the flow of steam instead of being back and forth in a path parallel to the plane of the wheel, or what is known as "radial" flow, is in this form an axial flow—that is to say, it flows back and forth through the wheel parallel to its axis. Fig. 10 is a section longitudinal to the shaft; Fig. 11, a detail of the wheel, showing the sectional character of the ring of buckets; and Fig. 12 is a section on line 12 12 of Fig. 10.

Referring to Fig. 1, B represents the base, upon which is mounted the two parts C C' of the casing, which parts are bolted to each other and also to the base. The outer section C' is formed with lugs l l, which are bolted to the base through an opening in which the lower part of the casing projects. The two sections C C' of the casing are cast with offsetting brackets c and c', on which are mounted the journal-bearings b b, which carry the main shaft. This shaft is best shown in Fig. 3, and to it is secured the rotating turbine-wheel W, which turns in the space between the two sections C C' of the casing.

The outer section C' of the casing is (see Figs. 3 and 4) cast with a steam-chest 9 on top of the same and with a large exhaust-opening E at the bottom. The steam-chest is covered by a detachable plate P, above a hole in which is mounted the throttle-valve T, through which steam is introduced from the boiler. The bottom of the steam-chest is formed of a detachable and circular steel plate 8, in which are formed a suitable number of steam-admission nozzles 8ª. This nozzle-plate 8 on its lower side is turned to the circular curve of the wheel, which it closely approaches, and on its top side is also turned to a parallel circular curve. The ports enter this plate from the top at about right angles and then turn to an oblique position which is nearly tangential to the circumference of the wheel and increase in their cross-sectional area as they approach the wheel in diverging form, so as to permit some expansion of the steam at the moment of impact.

The outer portion of the casing C' is formed with an annular chamber surrounding the wheel, which annular chamber is divided by web-partitions 14 14 into separate segmental chambers, of which 13 13 are arranged on opposite sides near the top and 13ª is at the bottom and in open communication with the exhaust-opening E. The chamber 13 on the left side has between it and the wheel a series of radial baffle-blades 10ª, located at the upper end, and a series of inclined nozzles 8ᶜ, located at the lower end of said chamber. The chamber 13 on the opposite side has in like manner between it and the wheel a series of radial baffle-blades 10ª, located at the upper end, and a series of inclined nozzles 8ᵉ, located at the lower end of said chamber; but the inclination of the nozzles on this side is upward toward the wheel, while that of the nozzles 8ᶜ on the other side is downward toward the wheel. In the lower segment 13ª of the annular chamber there are between this chamber and the wheel a series of radial baffle-blades 10ᶜ, which extend throughout the greater portion of the inner wall of the chamber and through which steam is discharged into the exhaust-outlet E. In the other section C of the wheel-casing there is formed a similar set of segmental annular chambers with nozzles and baffle-blades, all of which are arranged inside of the circular row of buckets w of the wheel and coöperate with the chambers, baffle-blades, and nozzles outside of the buckets of the wheel, as will be hereinafter described. This interior series of chambers, blades, and nozzles are formed and positioned as follows:

The upper segmental chamber 11 is separated from the lower segmental chamber 15 by web-partitions 12 12. The upper chamber 11 communicates in the middle with the buckets of the wheel through radial baffle-blades 10, which are immediately below the inlet-port nozzles 8ª in the bottom of the steam-chest, and the opposite ends of this chamber 11 communicate with the buckets of the wheel through tapering nozzles 8ᵇ and 8ᶠ, the inclination of the nozzles 8ᵇ being downward and outward and the inclination of the nozzles 8ᶠ being upward and outward. The lower annular segmental chamber 15 communicates at its upper ends on each side with the buckets of the wheel through radial baffle-blades 10ᵇ 10ᵇ, while the lower middle portion communicates with the buckets of the wheel by tapering and inclined nozzles 8ᵈ. The relation of the inner and outer series of nozzles, baffle-blades, and segmental chambers is as follows: The inner baffle-blades 10 are opposite the admission-nozzles 8ᵃ. The two outer series of baffle-blades 10ᵃ 10ᵃ are opposite the inner nozzles 8ᵇ and 8ᶠ, respectively. The two inner series of baffle-blades 10ᵇ 10ᵇ are opposite the outer series of nozzles 8ᶜ 8ᵉ, and the lower and outer series of baffle-blades 10ᶜ are opposite the inner series of nozzles 8ᵈ.

The steam as it passes from the steam-chest to the exhaust-opening E traverses the entire periphery of the wheel, but divides and flows in two directions, one half passing to the left in Fig. 4 to the exhaust-opening E and the other half to the right to the exhaust-opening, always acting upon the wheel with the same radius and maximum leverage, and in its traverse it is made to pass back and forth through the buckets of the wheel from inside to outside and from outside to inside any desired number of times. In the engine shown in Fig. 4 it passes in its left-hand travel in the direction of the small arrows as follows: from the admission-nozzles 8ᵃ directly onto the wheel, giving its first impact impulse. Issuing through the buckets it meets the baffle-blades 10 and imparts a reactionary thrust to the wheel. Passing to the left-hand end of the inner receiving-chamber 11 it issues outwardly through the nozzles 8ᵇ and is again delivered onto the buckets of the wheel with an impact impulse. It then passes into the upper end of left-hand receiving-chamber 13 and, meeting the baffle-blades 10ᵃ, imparts a reactionary thrust on the wheel; then through the lower end of chamber 13 it passes through the nozzles 8ᶜ onto the wheel, giving another impact impulse. As it issues from the buckets it meets the baffle-blades 10ᵇ and gives another reaction impulse to the wheel, and then goes to the inner receiving-chamber 15 and, moving downward, passes through the nozzles 8ᵈ and gives another impact impulse to the wheel. It then passes through the buckets to the outer receiving-chamber 13ᵃ and, striking the baffle-blades 10ᶜ, gives its last reaction impulse and escapes to the exhaust-opening E. The other portion of steam which has entered the upper receiving-chamber 11 passes to the right and issues through the nozzles 8ᶠ, strikes the buckets of the wheel with an impact, and enters outer receiving-chamber 13 on that side. Striking the baffle-blades 10ᵃ it imparts its reaction thrust to the wheel and passes to the lower end of chamber 13, and then it is directed through the nozzles 8ᵉ onto the wheel against the baffle-blades 10ᵇ and into the inner receiving-chamber 15, where it mingles with the steam which has traversed the other side and escapes with it through the nozzles 8ᵈ onto the wheel and into the exhaust.

It will be seen that by repeated and alternating impulse of impact and reaction all acting in the same direction on the wheel and all at the maximum leverage of the full radius of the wheel a very high efficiency is obtained and a very large power for a given size of wheel. The traverse of the wheel through its entire periphery in two directions at once while giving the full effectiveness of the entire periphery of the wheel permits the steam to escape from the wheel after making only half the circuit of the wheel, which reduces the back pressure and further increases the efficiency of the engine. It will also be seen that as the steam enters the wheel and divides it passes through two routes with a constantly-increasing nozzle-space and constantly-increasing size of receiving-chamber, so as to permit of the proper expansion of the steam.

In constructing the wheel W (see Fig. 3) one side (the right-hand side in Fig. 3) is turned to a right-angular plane, while the opposite side (the left side in Fig. 3) is somewhat battered, which makes the inner portions of the wheel thicker than the outer portions. In the opposite faces of this web portion of the wheel and also in the adjacent faces of the casing there are turned concentric grooves to form a water packing, as seen at $p\ p$. This permits the water of condensation to accumulate in these numerous grooves and form a closed water packing against the leakage of steam.

The buckets $w$ at the outer periphery of the wheel are constructed as follows, reference being had to Figs. 3, 4, and 4ᶜ: The bucket-walls are cut to the curve seen in Figs. 4 and 4ᶜ and are constructed in curved sections $w^2$, six inches, more or less, in length, and each section is integral with a laterally-projecting curved flange or rib $w'$, the curve being that of the circumference of the wheel. These sections are assembled upon the periphery of the wheel, and an encompassing steel tire or ring $x$ is shrunk upon the flanges $w'$ of all the sections, and a smaller tire or ring $x'$ is seated in a recess in the bucket-sections upon the other side and in like manner is shrunk to place. This method of construction permits the buckets to be made in sections which can be replaced if damaged and yet binds the whole so firmly to the wheel as to make them practically rigid. It also permits the buckets to project laterally from the plane of the web portion of the wheel, as seen in Fig. 3, and this enables me to conveniently bring the inner receiving-chambers, blades, and nozzles into the same plane with the buckets of the wheel for coöperation therewith.

I will now describe the means for enabling the turbine-wheel to find its own running center and plane of rotation. It is well known that it is nearly impossible to so turn a wheel and key it upon a shaft as to bring the center of its mass in the exact center of its axis and its plane exactly at right angles to this axis, and this when the wheel is at the high speed of many thousand revolutions a minute involves a great loss of power in the effort of the wheel to adjust itself. I have provided means by which this is accomplished in a simple and practical way without in any way impairing the transmission of power from the wheel to the driven machinery.

Referring to Fig. 3, the hub H of the wheel is rigidly keyed to the shaft S and is formed with a circular flange $h$, projecting outwardly. A collar $h'$ is fitted on this hub opposite the flange $h$, and through this collar and flange a series of bolts or screws $h^2$ are secured, and these bolts pass through and lock the web portion of the wheel W, but do not connect it in a rigid manner; but, on the contrary, the main portion W of the wheel, while rotating with the hub and imparting its motion thereto, is free to shift its center in its own plane and to have also a slight lateral motion for changing its plane to its true and exact plane of rotation and is also further connected to the hub so as to make the wheel impart its torque or rotary strain to the hub and shaft in an elastic manner for the purpose hereinafter described. The means by which the above results are secured are best shown in Figs. $4^a$ and $4^b$, which show enlarged details of this portion of the wheel. The inner portion of the web of the wheel is turned out, so that it is considerably larger than the hub portion of the wheel, and between this inner portion of the web and the outer portion of the hub are interposed two or more circular spring-rings R R' of different sizes, arranged concentrically and spaced away from each other and also away from the hub and from the inner web portion of the wheel. The inner ring R is spaced away from the hub by four lugs or projections $a\ a\ a\ a$, formed on the hub, as seen in Fig. $4^a$, and resting against the inner periphery of the ring. The outer ring R' is spaced away from the inner ring by four spacing-bars $a'\ a'\ a'\ a'$, placed between the rings. These spacing-bars $a'$ alternate in position with the spacing-lugs $a$—that is to say, each bar $a'$ is half-way between two lugs $a\ a$. Between the outer ring R' and the inner periphery of the web portion W of the wheel are four other spacing-bars $a^2\ a^2\ a^2\ a^2$, which in like manner alternate in position with the spacing-bars $a'$. All of these spacing-bars are held at their ends in seats $s$, drilled into the flange $h$ and collar $h'$ of the hub, as seen in Fig. $4^b$. With this construction it will be seen that the main portion W of the wheel may move bodily in any direction toward the center of the shaft, since one or the other of the spring-rings will always permit such movement by reason of the alternating position of the bearings and spacing-bars. It will therefore be seen that the wheel is free to find its own running center of rotation even if it is not quite truly centered in construction. In the inner side of the collar $h'$ (see Fig. $4^b$) there is formed a circular groove $g$, facing and opening toward the inner web portion of the wheel, and in this groove is arranged a series of spring-bearings $g'$. The portion of the web of the wheel which extends inwardly between the flange $h$ and collar $h'$ of the hub is also rabbeted or turned down, so that it is slightly thinner than the space between the said flange and collar, so that the wheel may move laterally against the spring-bearings $g'$ to slightly change its plane to accommodate its mathematically true plane of rotation if it be not exactly set to this plane.

I will now describe how the rotary strain or torque of the wheel is imparted to the hub and shaft in an elastic manner and also its value.

Where the wheel W is coupled to the hub by a connection which permits of freedom of motion as described, it is necessary to have the strain transmitted uniformly to the hub at all of the various driving-points around the wheel; otherwise a single bolt $h^2$ is liable to carry all of the strain and break or cause an irregular or unbalanced rotation. To avoid this latter contingency, I drill in the inner portion of the web of the wheel four, more or less, large holes $i$, through which the bolts or pins $h^2$ are to pass. Diametrically across these openings I insert spring driving-pieces $k$. These driving-pieces are rigidly secured at their ends in the web portions of the wheel by being entered into notches and there upset or riveted, so that they cannot come out. Now when the web of the wheel rotates in the direction of the large arrow its power is applied to the bolts or pins $h^2$ through the elastic driving-pieces $k$. This makes an elastic rotary strain or torque, and if it should happen that only one of the hub-bolts $h^2$ has a bearing at the start the elasticity of its bearing-piece $k$ allows the latter to bend slightly, and this allows the whole wheel to advance in relation to the hub and brings all the other driving-pieces $k$ into bearing contact with their bolts, and this distributes the working strain around the entire wheel. It will also be seen that these bearing-bars ride freely against the bolts and allow the wheel to shift its center according to the existing conditions.

It will be seen from the foregoing that my turbine-wheel is perfectly free to adjust itself to any position which it may seek in response to natural laws, and thus conserves a large amount of energy that is otherwise wasted, and this consequently increases the efficiency of the engine.

I will now describe the automatic governor and cut-off mechanism, which is especially designed for and related to my turbine-engine and whereby the engine is made to automatically adjust itself to the load.

Referring now to Figs. 3 and 4, it will be seen that the main shaft of the wheel is prolonged on one side and inclosed within a cylindrical casing 16, mounted on the end of one of the journal-bearings $b$. On the end of the shaft in this casing is rigidly fixed a hub 17. A grooved sleeve 18 is also arranged upon the shaft in this casing and is connected by a feather and groove in such a way that while it revolves with the shaft it can slide longitudinally thereon. To the rigid hub 17 and sliding sleeve 18 are fixed the opposite ends of weighted spring-bars 4, arranged longitudinally. In the peripheral groove of the sliding sleeve 18 is arranged to swivel the lower forked end of an upright lever 5, fulcrumed at 19. When the shaft S runs too fast, the weights of the spring-bars 4 are thrown outwardly from centrifugal action, and this shortens the bars and pulls the sleeve 18 to the left in Fig. 3 and deflects the lever 5, and this acts as an automatic governor and is made to operate the cut-off mechanism, as hereinafter described.

On top of the cylinder 16 (see Figs. 2 and 3) is mounted a casing 20, in which is bored a horizontal hole to receive a cylinder 21, which in turn contains a coil-spring 22. A stem 23 is jointed at one end to the lever 5 and passes into the casing and through the coil-spring and has on its end a head that presses against the coil-spring, which is held between this head and the opposite end of the cylinder 21. An external screw-cap 3 is provided with an internal screw-thread which meshes with an external screw-thread on the spring-housing cylinder. This screw-cap has a flat bearing against the casing 20 and when turned puts a variable tension on the spring by drawing out the housing-cylinder 22. Above the spring another cylindrical bore 2 is formed in the casing 20, and in this is fitted a double-headed balanced valve 25, which has a through-passage 26 in it extending along the center and opening at opposite ends of the valve. This balanced valve is connected by a rod 24 with the upper end of the upright governor-lever 5. In the casing 2 near one end is an inlet-port 27 and an outlet-port 30. The outlet-port 30 communicates with an exhaust-pipe 35. (See Fig. 1.) The inlet-port 27 communicates with a pipe 28, leading to the cut-off valve. Between the heads of the balanced valve 25 a supply-pipe 29 leads from the steam-pipe above the throttle-valve and keeps the space between the heads of the balanced valve always charged with live steam.

Referring now to Fig. 4, there is arranged in the valve-chest 9 a long horizontal rod 6. This is slotted above its middle on the under side to receive a stud $v'$, rising from and fixed to the cut-off valve $v$. This cut-off valve is especially related to the turbine and is formed of a plate dressed to the arc of the circle of the bottom 8 of the valve-chest, in which the steam-nozzles $8^a$ are formed. The cut-off valve has a series of holes through it, all of which in one position register with the steam-nozzles $8^a$, as shown. The openings in the cut-off valve, however, are of different length, increasing progressively, so that as the valve $v$ slides over the circular seat it shuts off steam from the nozzles, one or two at a time, in a gradually progressive manner. Motion is imparted to the cut-off valve by the reciprocation of the rod 6, which is loosely connected to the valve by the stud $v'$, as before described. In one end of the valve-chest is fitted a small cylinder 1, in which slides a piston 31 on the end of rod 6. The other end of the rod passes through a stuffing-box 34 in the other end of the valve-chest and is provided externally with an index hand or pointer 32, which is arranged to play over a graduated scale 33, mounted exteriorly on the turbine-casing. The position of this pointer on the scale indicates the extent of the cut-off position of the valve. In the outer end of the small cylinder 1 there is connected the end of the pipe 28 leading from the governor-valve. (See Figs. 1, 2, 3, and 4.)

The operation of the automatic cut-off is as follows: When the engine is in normal running position with the nozzles $8^a$ all open, as shown in Fig. 4, the balanced valve 25, Fig. 2, is in the position shown, which cuts off communication between the ports 27 and 30, but allows communication between the live-steam pipe 29 and the port 27, with the result that live-steam pressure passes up pipe 28 and into the end of the cylinder 1, Fig. 4, and holds the piston 31 and rod 6 over to the left-hand position, as shown, since the steam area on the right of piston 31 is greater than it is on the left. If now the engine should have a tendency to accelerate its speed, the weights of the governor-bars 4, Fig. 3, fly outwardly, pulling the sleeve 18 outwardly on shaft S, deflecting lever 5 and pulling the balanced valve 25 to the right. This opens communication between port 27 and exhaust 30, and the steam which was on the right of piston 31 in cylinder 1 is allowed to pass back through pipe 28 and reaching pipe 35 is exhausted into the air. The result will be that the preponderating steam-pressure on the left of piston 31, Fig. 4, will force rod 6 and cut-off valve $v$ to the right, cutting off more or less of the steam-admission nozzles, according to the speed. When the speed slackens, the weighted bars straighten again, and the spring 22 pulls the lever 5 back again, and the balanced valve 25 is forced to the left, again cutting off communication between ports 27 and 30 and reëstablishing communication between pipes 29 and 28 and allowing live steam to enter the end of cylinder 1 and force the rod 6 and valve $v$ to the full-open position again.

To vary the sensitiveness of the cut-off mechanism, the screw-cap 3 and cylindrical spring-housing 21 are the agencies provided. By turning the screw-cap 3 in one direction it is made to pull the housing 21 outwardly, and this compresses the spring 22 and increases the power required from the governor-weights to pull out the balanced valve 25.

In the engine illustrated in Figs. 1 to 4 I have shown its simplest form, with only a single row of buckets on one side of the wheel-web and a single series of receiving-chambers, nozzles, and baffle-blades. It will be obvious that the wheel may be made double—i. e., each wheel-web may have two series of buckets and coöperating parts, one on each side. In Figs. 5 and 6 I have shown a turbine constructed in this way. In Fig. 5, $w^3$ $w^4$ are the two series of buckets on opposite sides of the same wheel-web W', both sides $C^2$ $C^3$ of the casing being in this instance substantially similar to each other. This double wheel will give double the power that the single wheel does. I also show in the same view how the units of this form of engine may be indefinitely extended on the same shaft, in which $C^4$ $C^5$ $W^2$ represent a second double wheel connected to the first by screws $s^2$ $s^3$, connecting their casings, and with a common shaft $S^2$ coupled to the wheels. I also show in this view the governor connected directly to the throttle-valve and also in Fig. 6 a modified form of the cut-off valve in which the valve-rod $6^a$ is a jointed pitman and the indicator $32^a$ and $33^a$ is on the same side of the valve-chest as the piston $31^a$, its principles of action, however, being the same as those already described. I will now show how the same form of engine may be made to reverse or run in either direction, as is very necessary when it is applied to driving a ship's propeller. This construction is shown in Figs. 7, 8, and 9. This wheel is a double wheel with a row of buckets on each side of the wheel-web, but with this difference, that the curves of the buckets and the inclination of the nozzles on one side of the wheel are reverse to that on the other side, as seen in dotted lines in Fig. 8. In this form of wheel each set of admission-ports has its own cut-off valve and operating mechanism, one of which cut-off valves $v^2$ is shown in full lines on the right and the other, $v^3$, in dotted lines on the left, each working in the plane of the admission-ports of its own side of the wheel. Above the two steam-chests (see Fig. 9) there is a reversing-valve V of the sleeve type connected to a rod V', extending through a stuffing-box and connected to and operated by an external hand-lever $V^2$, Fig. 7. This reversing-valve works in a cylinder U, Fig. 9, which has two separate ports $u$ $u'$, opening into the two subjacent steam-chests $9^a$ and $9^b$ for the two sides of the wheel. When the reversing-valve V is thrown to the right of Fig. 9, it opens the port $u$ and steam-chest $9^a$ to the throttle, and steam is admitted to the left side of the wheel to turn it forward. When the reversing-valve V is thrown to the left, it closes the port $u$ and opens $u'$ and admits steam to the steam-chest $9^b$ and the opposite side of the wheel to turn the wheel backward, thus making a simple and easy means of reversal. It will be understood that the units of the engine as thus described may be assembled so that a number of the wheels may be operated together for the forward movement, but only a part of them for the backward movement, since it is not generally required to operate a marine propeller with full speed astern.

In the forms of the engine so far described the steam passes through the buckets of the wheel in a radial direction or a direction parallel to the plane of the wheel and at right angles to the axis. In Figs. 10, 11, and 12 I show how the engine may be modified to permit of the flow of steam through the buckets in direction parallel to the axis of the wheel. In this instance the wheel $W^3$ has a peripheral row of curved buckets $w^6$, (see Figs. 11 and 12,) which open through the wheel from side to side. These are made in sections held in place by a tire or band $x^2$. One side $C^7$ of the case is provided with a steam-chest P', Figs. 10 and 12, and the other side $C^6$ of the case has the exhaust-opening E'. The two sides of the case are formed at points opposite the ring of buckets between the steam-chest and exhaust with receiving-chambers, nozzles, and baffle-blades arranged alternately on opposite sides and positioned and proportioned as heretofore described. In this form of engine the steam passes back and forth through the wheel from side to side in a direction longitudinal to the axis, zigzagging back and forth until it passes entirely around the axis and escapes at the exhaust.

In all the forms of my invention it will be seen that the steam passes alternately in opposite directions through the same series of buckets in the wheel. This is important in that it causes a neutralization of the thrust of impact on the wheel and makes a perfectly-balanced wheel in which there is no cumulative thrust in any one direction. This is of especial importance in the wheels of axial flow. (Shown in Figs. 10, 11, and 12.) In order to permit the steam to flow through and act alternately in opposite directions on the same row of buckets in the wheel, it is necessary that the buckets of the wheel should be of symmetrical construction on opposite sides—i. e., the receiving-throat of the bucket is of the same construction and curve as the discharging-throat and the outer edges of the opposite sides of the buckets trend or point in the same direction and lie substantially on the same radial line.

In carrying out my invention I would have it understood that I do not confine myself to the special construction and arrangement of parts shown, as many of these details may be varied without departing from the spirit and scope of my invention.

Having thus described my invention, what I claim as new, and desire to secure by Letters Patent, is—

1. An elastic-fluid turbine, comprising a wheel with a row of buckets at its periphery of the same shape and trend on both the receiving and exhaust sides, and a casing formed with admission and exhaust ports, and receiving-chambers on opposite sides of the row of buckets, said receiving-chambers alternating upon opposite sides of the row of buckets and gradually increasing in capacity toward the exhaust, the receiving-chambers having between them and the row of buckets, baffle-blades and inclined nozzles, said nozzles being formed in peripheral portions of the receiving-chambers fitting close to the wheel, the baffle-blades of the receiving-chamber on one side of the buckets being opposite the nozzles on the other side of the buckets to pass the steam back and forth through the same buckets of the wheel, substantially as and for the purpose described.

2. An elastic-fluid turbine, comprising a wheel with a row of radial-flow buckets at the periphery of the same shape and trend on both the receiving and exhaust sides, and a casing formed with admission and exhaust ports, and receiving-chambers arranged alternately outside and inside the row of buckets and gradually increasing in capacity toward the exhaust, the receiving-chambers having between them and the row of buckets baffle-blades and inclined nozzles, said nozzles being formed in peripheral portions of the receiving-chambers fitting close to the wheel, the baffle-blades of the outer chambers being opposite the nozzles of the inner chambers and the baffle-blades of the inner chambers being opposite the nozzles of the outer chambers to pass the steam back and forth through the same buckets of the wheel, substantially as and for the purpose described.

3. An elastic-fluid turbine, comprising a wheel with a row of buckets at the periphery of the same shape and trend on both the receiving and exhaust sides and a casing having admission-ports and an exhaust-opening on opposite sides of the wheel, and receiving-chambers on opposite sides of the row of buckets having baffle-blades and nozzles, said nozzles being formed in peripheral portions of the receiving-chambers fitting close to the wheel, said receiving-chambers alternating on opposite sides of the row of buckets and increasing in capacity toward the exhaust and proceeding from the admission-ports in two series on opposite sides of the axis of the wheel, each series extending from the admission-ports to the exhaust to take the steam back and forth through the same buckets of the wheel in two paths on opposite sides of the wheel in passing from the first admission-ports to the exhaust substantially as and for the purpose set forth.

4. An elastic-fluid turbine, comprising a wheel with a row of buckets at the periphery of the same shape and trend on both the receiving and exhaust sides, and a two-part casing, one part being formed with admission and exhaust ports and with a series of separate receiving-chambers of gradually-increasing size toward the exhaust-port, and the other part being formed with a similar series of receiving-chambers, the receiving-chambers of both series having between them and the buckets baffle-blades and nozzles, the latter formed in the peripheral portions of the receiving-chamber fitting close to the wheel, with the baffle-blades and nozzles of one receiving-chamber alternating with those of the opposite receiving-chamber to pass the steam back and forth through the same buckets of the wheel, substantially as described and for the purpose set forth.

5. An elastic-fluid turbine, comprising a wheel with two rows of radial-flow buckets, each bucket having the same shape and trend for both its receiving and exhaust sides, one row arranged on each side and projecting beyond the plane of the web portion of the wheel, a casing formed with admission and exhaust ports and receiving-chambers arranged alternately outside and inside the rows of buckets and gradually increasing in capacity toward the exhaust, the receiving-chambers having between them and the rows of buckets baffle-blades and inclined nozzles, the latter formed in a peripheral portion of the receiving-chambers fitting close to the wheel, the baffle-blades and nozzles of the inner and outer chambers alternating in position on opposite sides of the wheel to pass the steam back and forth through the same buckets of the wheel, and the outer and inner sets of receiving-chambers, baffle-blades and nozzles being arranged in two sets lying in parallel planes upon opposite sides of the web of the wheel substantially as and for the purpose described.

6. An elastic-fluid turbine comprising a wheel with two rows of radial-flow buckets, one row arranged on each side and projecting beyond the plane of the web portion of the wheel, and the two series of buckets having a reverse curve, a casing formed with double admission-ports and an exhaust-port and receiving-chambers arranged alternately outside and inside the rows of buckets and gradually increasing in capacity toward the exhaust, the receiving-chambers having between them and the rows of buckets baffle-blades and inclined nozzles, the baffle-blades and nozzles of the inner and outer chambers alternating in position, and the outer and inner sets of receiving-chambers, baffle-blades, and nozzles being arranged in two sets lying in parallel planes upon opposite sides of the web of the wheel and with the nozzles of one set reversely inclined to those of the other set, and a reversing-valve controlling the flow of steam to the two sets of admission-ports substantially as shown and described and for the purpose set forth.

7. A rotary engine comprising a case, a rigid shaft, a flanged hub fixed to the shaft and having a collar embracing the hub, bolts connecting the collar to the flange of the hub, a rotary wheel having its inner periphery arranged between the collar and flange and loosely connected thereto by the bolts, and two or more spring-rings arranged between the hub and the wheel and means for spacing the rings away from each other and from the hub and the wheel substantially as described.

8. A rotary engine comprising a case, a rigid shaft, a flanged hub with peripheral projections fixed to the shaft and having a collar embracing the hub, bolts connecting the collar to the flange of the hub, a rotary wheel having its inner periphery larger than the hub and arranged between the collar and the flange of the hub and connected thereto by the bolts, concentric spring-rings arranged between the hub and wheel, and spacing-bars arranged between the rings and alternating in position with the bearing-points of the hub and the wheel substantially as described.

9. A rotary engine comprising a case, a rigid shaft, a flanged hub with a collar, a rotary wheel having its inner periphery embraced between the flange and collar and formed with openings having spring-bars across the same and bolts connecting the collar to the flange and passing through the openings in the wheel and bearing against the spring-bars substantially as and for the purpose described.

10. A rotary engine comprising a wheel, a case having a steam-chest with a circularly-curved bottom having admission-ports through the same, a circularly-sliding cut-off valve, a stem connected to the same and provided with a piston, a cylinder for said piston having an opening at its end, an automatic governor, and a governor-valve controlling the admission of steam to the cut-off-valve piston substantially as described.

11. A rotary engine comprising a wheel, a case having a steam-chest with a circularly-curved bottom having admission-ports through the same, a circularly-sliding cut-off valve, a stem connected to the same and having a piston and a cylinder, an index-hand fixed to the stem outside the steam-chest, a graduated scale for the same, an automatic governor and governor-valve controlling the flow of steam to and from the cut-off-valve cylinder substantially as described.

12. A rotary engine comprising a wheel, a case having a steam-chest with a circularly-curved bottom having admission-ports through the same, a circularly-sliding cut-off valve, a stem loosely connected to the same and having at one end a piston and a piston-cylinder and its other end extended through the steam-chest and provided with an index-hand, a graduated scale for the same and a governor and governor-valve controlling the flow of steam to and from the cut-off-valve cylinder substantially as described.

13. A rotary engine comprising a wheel, a case having a steam-chest with admission-ports, a sliding cut-off valve, a stem connected to the same and having at one end a piston and piston-cylinder, two steam-pipes, one leading to the end of said cylinder and the other to the live-steam supply, a governor-valve comprising a cylinder having said two steam-pipes tapped into it and having an exhaust-opening, a balanced valve arranged in said latter cylinder, a lever connected to the same and a centrifugal governor located on the main shaft of the rotary engine and operating said lever and governor-valve, and admitting steam to and from the cut-off-valve piston substantially as described.

14. A rotary engine comprising a wheel, a case having a steam-chest with admission-ports, a sliding cut-off valve, a stem connected to the same and having at one end a piston and a piston-cylinder, two steam-pipes, one leading to one end of the said cylinder and the other to the live-steam supply, a governor-valve comprising a cylinder having said two steam-pipes tapped into it and having an exhaust-opening, a balanced valve arranged in said latter cylinder, a lever connected to the same, a centrifugal governor located on the main shaft of the rotary engine and operating said lever and governor-valve, and a spring with adjusting device acting upon the valve-lever to vary its sensitiveness of action substantially as described.

MARTIN A. GREEN.

Witnesses:
ELMER A. GREEN,
ROBT. B. FLETCHER.